US009264888B2

(12) United States Patent
Starr

(10) Patent No.: US 9,264,888 B2
(45) Date of Patent: Feb. 16, 2016

(54) CONTROL OF A MOBILE DEVICE

(71) Applicant: LENOVO (Singapore) PTE, LTD., New Tech Park (SG)

(72) Inventor: Ephraim D. Starr, Rancho PV, CA (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/659,315

(22) Filed: Mar. 16, 2015

(65) Prior Publication Data

US 2015/0195703 A1 Jul. 9, 2015

Related U.S. Application Data

(63) Continuation of application No. 12/751,569, filed on Mar. 31, 2010, now Pat. No. 8,982,781.

(51) Int. Cl.
| | |
|---|---|
| *H04W 8/22* | (2009.01) |
| *G06F 9/445* | (2006.01) |
| *H04L 29/06* | (2006.01) |
| *H04W 4/02* | (2009.01) |
| *H04W 12/08* | (2009.01) |
| *H04W 4/16* | (2009.01) |
| *H04W 4/22* | (2009.01) |

(52) U.S. Cl.
CPC ............. *H04W 8/22* (2013.01); *G06F 9/44505* (2013.01); *H04L 63/105* (2013.01); *H04W 4/02* (2013.01); *H04W 4/16* (2013.01); *H04W 4/22* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 7,026,918 | B2 | 4/2006 | Briick |
| 7,110,753 | B2 | 9/2006 | Campen |
| 7,353,034 | B2 | 4/2008 | Haney |
| 2004/0176107 | A1 | 9/2004 | Chadha |
| 2005/0038573 | A1 | 2/2005 | Goudy |
| 2006/0211412 | A1 | 9/2006 | Vance |
| 2007/0135093 | A1 | 6/2007 | Landschaft et al. |
| 2008/0102818 | A1 | 5/2008 | McArdle |

(Continued)

FOREIGN PATENT DOCUMENTS

EP    2129171 A1    2/2009

OTHER PUBLICATIONS

Prosoloo, "i-baby E86 User Guide", Apr. 10, 2009, Prosoloo, all pages.*

(Continued)

*Primary Examiner* — Kwang B Yao
*Assistant Examiner* — Adam Duda
(74) *Attorney, Agent, or Firm* — Kunzler Law Group

(57) ABSTRACT

A method, apparatus, and computer readable storage medium are disclosed to control a mobile device. A disable event module detects a failure to respond to a communication. The communication is sent to a mobile communications device from a supervisory source. A function disable module disables one or more functions of the mobile communications device in response to detecting the failure to respond to the communication. An enable event module detects a second communication between the mobile communications device and the supervisory source. A function enable module enables the one or more functions in response to detecting the second communication.

20 Claims, 9 Drawing Sheets

(56) References Cited

U.S. PATENT DOCUMENTS

2009/0247143 A1    10/2009    Hayashi et al.
2009/0309787 A1    12/2009    Gildea

OTHER PUBLICATIONS

"Child's Personal Bodyguards to See Phone 61 Konka Q6 Gift of Children", China Mobile, www.Chinamobile.com (English translation attached) Jul. 22, 2009.

* cited by examiner

CONTROL OF A MOBILE DEVICE

CROSS-REFERENCE TO RELATED APPLICATIONS

This application is a continuation of and claims priority to U.S. patent application Ser. No. 12/751,569 entitled "Control of A Mobile Device" and filed on Mar. 31, 2010 for Ephraim D. Starr which is incorporated herein by reference.

BACKGROUND

1. Field

The subject matter disclosed herein relates to control of a mobile device and more particularly relates to remotely controlling a mobile communications device.

2. Description of the Related Art

Mobile communications devices are becoming increasingly ubiquitous. The use of mobile telephones has become nearly universal. Other mobile devices such as mobile gaming devices, mobile media player devices, electronic readers ("e-readers"), and the like also routinely include communications functions. These communications functions can provide access to wireless data networks for browsing the Internet or accessing email and can provide mobile telephone device functionality such as voice calling and text messaging.

There are many situations where one person provides a mobile communications device for another person's use. For example, many parents provide mobile telephones or other mobile communications devices to their children. This provides a convenient manner for parents and children to communicate and has safety benefits for the children. Many employers also provide various mobile communications devices to employees to facilitate communication with the employees and to improve productivity.

When a supervisory entity such as a parent or employer provides a mobile communications device to another user, such as a child or an employee, the supervisory entity may wish to place certain restrictions on the use of the mobile communications device. For example, the supervisory entity may want to ensure that the other user responds to communications from the supervisory entity, that the other user does not exceed certain usage limits, or that the other user uses the mobile communications device for certain purposes. Traditionally, if the other user refuses to abide by restrictions set by the supervisory entity, the supervisory entity's primary option to enforce the restrictions is to take back the mobile communications device from the other user.

Other options exist, such as to suspend payment to the network carrier, following which the carrier may discontinue service to the mobile communications device. Alternatively, in the corporate enterprise context, an IT services group may be able to disable certain functions of the mobile communications device such as access to the corporate enterprise email server. In each of these contexts, however, re-enabling the discontinued services involves a time-consuming or otherwise inefficient process. For example, the mobile communications device's user may be required to contact a customer support center, follow a series of steps, and/or otherwise fulfill multiple requirements before services are resumed.

SUMMARY

The present inventor has recognized a need for a method, apparatus, and computer readable storage medium that provide efficient, responsive control over a mobile device. Such a method, apparatus, and computer readable storage medium allow the disabling and/or enabling of one or more functions of a mobile device remotely, promptly and efficiently.

A method is presented to control a mobile device. In one embodiment, the method includes detecting a failure to respond to a communication. The communication is sent to a mobile communications device from a supervisory source. The method further includes disabling one or more functions of the mobile communications device in response to detecting the failure to respond to the communication.

The method, in one embodiment, includes detecting a second communication between the mobile communications device and the supervisory source. The method may include enabling the one or more functions in response to detecting the second communication. In one embodiment, the second communication comprises a voice call between the mobile communications device and the supervisory source that lasts at least a predefined duration.

The second communication, in a further embodiment, comprises an enable confirmation from the supervisory source. In one embodiment, the second communication includes a voice call between the mobile communications device and the supervisory source and the enable confirmation includes a code generated at the supervisory source during the second communication. In another embodiment, the enable confirmation includes a text message from the supervisory source to the mobile communications device.

The method, in another embodiment, includes establishing an expected location at the supervisory source. In a further embodiment, the method includes determining that the expected location matches a current location of the mobile communications device. In one embodiment the one or more functions are enabled in response to detecting the second communication and a determination that the expected location matches the current location.

In one embodiment, the second communication includes a time-stamped photograph sent from the mobile communications device to the supervisory source. The one or more functions, in another embodiment, are enabled in response to detecting the second communication and in response to receiving an enable confirmation from the supervisory source. The enable confirmation, in one embodiment, is associated with the time-stamped photograph.

In a further embodiment, the method includes allowing communications between the mobile communications device and the supervisory source while the one or more functions are disabled. The method, in another embodiment, includes allowing one or more emergency communications from the mobile communications device while the one or more functions are disabled. In one embodiment, the method includes initiating an alert from the mobile communications device in response to detecting the failure to respond to the communication.

The method, in one embodiment, includes waiting a predefined time period in response to receiving the communication. In a further embodiment, detecting the failure to respond to the communication includes detecting a failure to respond to the communication within the predefined time period.

In another embodiment, the method includes detecting a failure to respond to a predefined number of previous communications from the supervisory source that were sent to the mobile communications device from the supervisory source prior to the communication. In one embodiment, the one or more functions of the mobile communications device are disabled in response to detecting the failure to respond to the communication and in response to detecting the failure to respond to the predefined number of previous communications. The method, in a further embodiment, includes selectively disabling one or more different functions of the mobile communications device in response to detecting the failure to respond to at least one of the predefined number of previous communications. In one embodiment, the method includes enabling the one or more different functions in response to detecting a second communication.

The mobile communications device, in one embodiment, comprises a mobile telephone device. In a further embodiment, the supervisory source includes a predefined telephone number and the communication includes a voice call from the predefined telephone number. In another embodiment, the communication includes an email message and/or a text message. A failure to respond to the communication, in another embodiment, includes a failure to view the communication within a predefined time period. In one embodiment, the communication comprises a predefined disable command. In a further embodiment, the detecting and the disabling are performed via a network controller.

A computer readable storage medium is also presented to control a mobile device. The computer readable storage medium stores computer executable program code on a tangible storage device. The computer executable program code is executable to perform operations. In one embodiment, the operations are substantially similar to one or more of the method embodiments described above.

The operations, in one embodiment, include detecting a failure to respond to a communication. In one embodiment, the communication is sent to a mobile communications device from a supervisory source. In a further embodiment, the operations include disabling one or more functions of the mobile communications device in response to detecting the failure to respond to the communication.

The operations, in another embodiment, include detecting a second communication between the mobile communications device and the supervisory source. In one embodiment, the operations include enabling the one or more functions in response to detecting the second communication.

In one embodiment, the mobile communications device includes a mobile telephone device. In a further embodiment, the supervisory source includes a predefined telephone number and the communication includes a voice call from the predefined telephone number.

Another method is presented to control a mobile device. In one embodiment, the method includes detecting a failure to respond to a communication. The communication is sent to a mobile communications device from a supervisory source. The method further includes disabling one or more functions of the mobile communications device in response to detecting the failure to respond to the communication. In one embodiment, the method includes detecting a second communication between a mobile communications device and the supervisory source. In another embodiment, the method includes enabling one or more functions of the mobile communications device in response to detecting the second communication.

The method, in one embodiment, includes waiting a predefined time period in response to receiving the communication. In a further embodiment, detecting the failure to respond to the communication includes detecting a failure to respond to the communication within the predefined time period.

In another embodiment, the method includes detecting a failure to respond to a predefined number of previous communications from the supervisory source that were sent to the mobile communications device from the supervisory source prior to the communication. In one embodiment, the one or more functions of the mobile communications device are disabled in response to detecting the failure to respond to the communication and in response to detecting the failure to respond to the predefined number of previous communications. The method, in a further embodiment, includes selectively disabling one or more different functions of the mobile communications device in response to detecting the failure to respond to at least one of the predefined number of previous communications. In one embodiment, the method includes enabling the one or more different functions in response to detecting the second communication.

The method, in another embodiment, includes establishing an expected location from the supervisory source. In a further embodiment, the method includes determining that the expected location matches a current location of the mobile communications device. In one embodiment the one or more functions are enabled in response to detecting the second communication and a determination that the expected location matches the current location.

In one embodiment, the communication includes a time-stamped photograph or live video sent from the mobile communications device to the supervisory source. The one or more functions, in another embodiment, are enabled in response to detecting the communication and in response to receiving an enable confirmation from the supervisory source. The enable confirmation, in one embodiment, is associated with the time-stamped photograph or live video.

An apparatus to control a mobile device, in one embodiment, includes a mobile communications device. The mobile communications device is provided with a plurality of modules configured to functionally execute the steps of the methods and the operations of the computer readable storage medium described above. The modules, in one embodiment, include a disable event module, a function disable module, an enable event module, and a function enable module.

In one embodiment, the disable event module is configured to detect a failure to respond to a communication. The communication, in one embodiment, is sent to the mobile communications device from a supervisory source. The function disable module, in one embodiment, is configured to disable one or more functions of the mobile communications device in response to detecting the failure to respond to the communication.

In one embodiment, the enable event module is configured to detect a second communication between the mobile communications device and the supervisory source. The function enable module, in one embodiment, is configured to enable the one or more functions in response to detecting the second communication.

In a further embodiment, the mobile communications device includes a mobile telephone device. The supervisory source, in another embodiment, includes a predefined telephone number. In one embodiment, the communication includes a voice call from the predefined telephone number. In yet another embodiment, the supervisory source may include another source that is not predefined, but otherwise enables or permits the user of the source to by uniquely identified References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer executable programs stored on tangible, non-transitory storage devices, and/or execute programmed functions. Modules may also include a computer readable storage medium comprising a computer executable program stored on a tangible, non-transitory storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
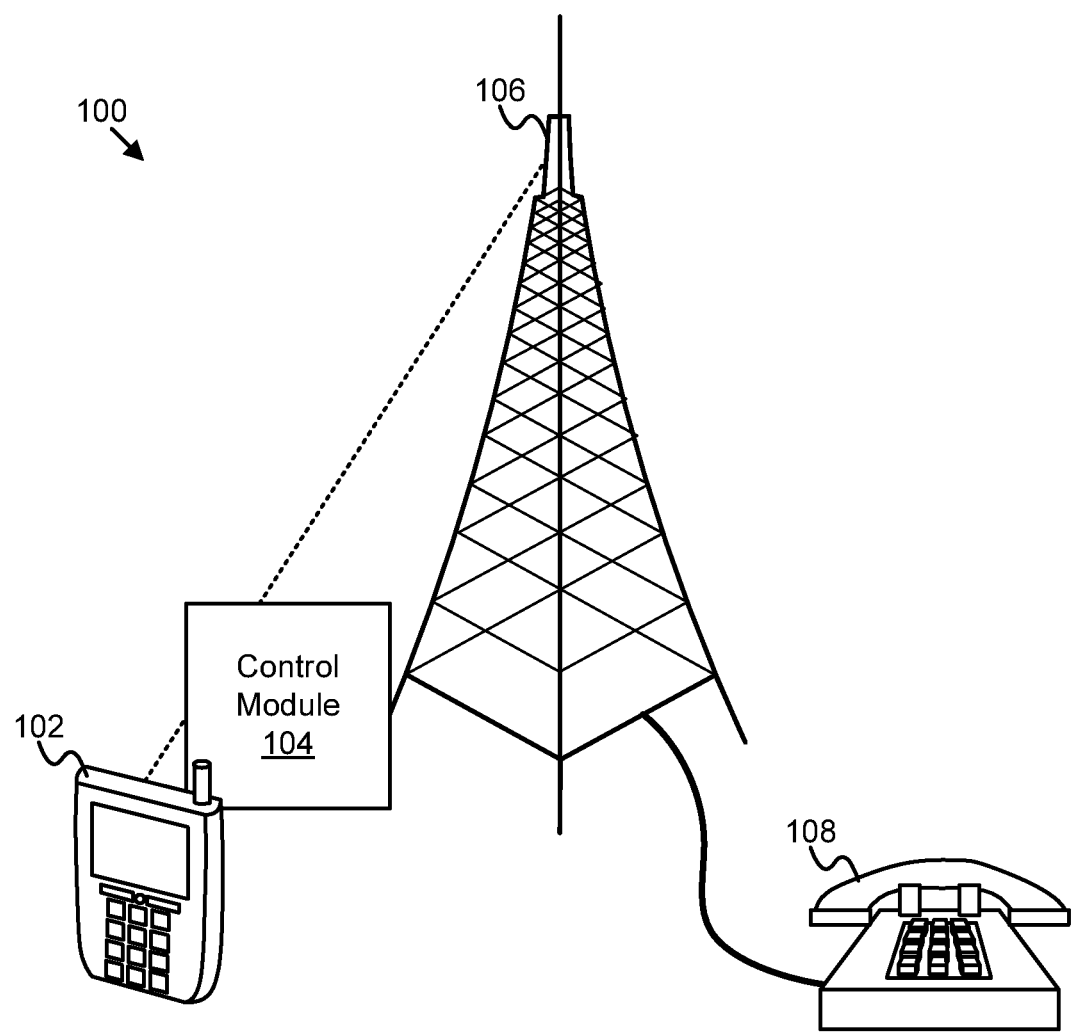
FIG. 1 is a schematic block diagram illustrating one embodiment of a system for control of a mobile device.

FIG. 1 depicts one embodiment of a system 100 for control of a mobile communications device 102. In the depicted embodiment, the system 100 includes the mobile communications device 102, a control module 104, a communications network 106, and a supervisory source 108. In general, the system 100, using the control module 104, allows a user at the supervisory source 108 to control one or more functions of the mobile communications device 102 remotely over the communications network 106. For example, in one embodiment, the control module 104 may disable and/or enable certain functions on the mobile communications device 102 in response to a communication from the supervisory source 108. By using the system 100, for example, an owner of the mobile communications device 102 that provides the mobile communications device 102 to another user can enforce certain restrictions on the use of the mobile communications device 102, encourage the other user to respond to communications from the owner, and the like.

In one embodiment, the mobile communications device 102 sends and receives communications over the communications network 106. In various embodiments, the mobile communications device 102 may include a mobile telephone device, a mobile gaming device, a mobile media player device, a mobile computing device, an electronic reader ("e-reader") device, a mobile texting device, a mobile email device, and/or another type of mobile communications device 102 that is capable of sending and receiving communications.

The mobile communications device 102, in one embodiment, is capable of sending and receiving one or more types of communications, such as voice calls, text messages, emails, binary data packets, and the like. Examples of text messages include short message service ("SMS") messages, multimedia messaging service ("MMS") messages, instant messages ("IM's"), and the like. In a further embodiment, the mobile communications device 102 is capable of one or more additional functions, such as media playback, video game functions, software application execution, Internet browsing, camera functions, global positioning system ("GPS") or other location-based functions, and the like.

The mobile communications device 102, in one embodiment, may include various hardware components to send and receive communications, provide additional functions, and to interact with a user. For example, in one embodiment, the mobile communications device 102 may include a processor, volatile memory, non-volatile data storage, a transmitter, a receiver, a display screen, a microphone, a speaker, a battery or other power source, one or more user input devices, and/or other components. Examples of user input devices, in one embodiment, include buttons, keys, touchscreens, touchpads, dials, rockers, switches, pointing sticks, trackballs, optical pads, scroll wheels, and the like.

In one embodiment, an owner of the mobile communications device 102, such as a parent, an employer, or the like, provides the mobile communications device 102 to a user, such as a child, an employee, or the like. The owner may intend for the user to make use of the mobile communications device 102, but may still wish to retain some control over that use or provide some restrictions on that use. The mobile communications device 102, in a further embodiment, may be a children's mobile device designed or adapted specifically for a child's use.

In one embodiment, the control module 104 enables and/or disables functions of the mobile communications device 102 based on one or more communications between the mobile communications device 102 and the supervisory source 108. The control module 104, in one embodiment, resides on the mobile communications device 102. For example, in various embodiments, the control module 104 may be part of, integrated with, or in communication with a firmware, basic input/output system ("BIOS"), operating system, executable software application, or the like, of the mobile communications device 102. In one embodiment, the control module 104 may be provided with the mobile communications device 102 by a manufacturer or distributor of the mobile communications device 102. In a further embodiment, an end user of the mobile communications device 102 may install, execute, or otherwise integrate the control module 104 with the mobile communications device 102, or, the supervisor, parent, financially responsible, or otherwise responsible party may install the control module 104, or cause it to be installed, on the mobile communications device 102. For example, in one embodiment, the control module 104 includes a downloadable software application that can be installed on, executed by, or otherwise integrated with the mobile communications device 102.

In another embodiment, the control module 104 may reside in the communications network 106. For example, in various embodiments, the control module 104 may be part of, integrated with, or in communication with a network controller, such as a base station controller, a mobile switching center, or another network controller capable of enabling and/or disabling one or more functions on the mobile communications device 102. In a further embodiment, the control module 104 is part of, is integrated with, or is otherwise in communication with a network controller that can block and unblock individual communications to and from the mobile communications device 102, either independently or with cooperation from the mobile communications device 102.

Figure 2:
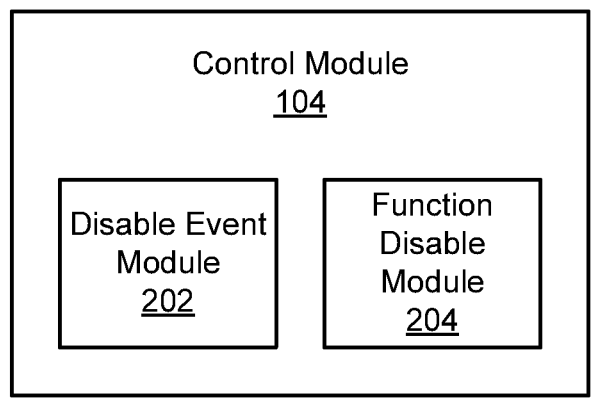
FIG. 2 is a schematic block diagram illustrating one embodiment of a control module.
Figure 3:
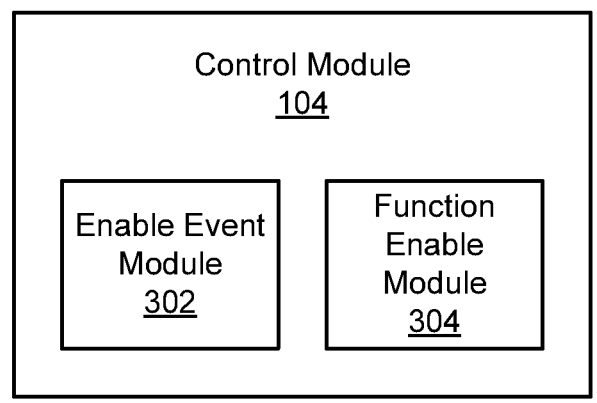
FIG. 3 is a schematic block diagram illustrating another embodiment of a control module.
Figure 4:
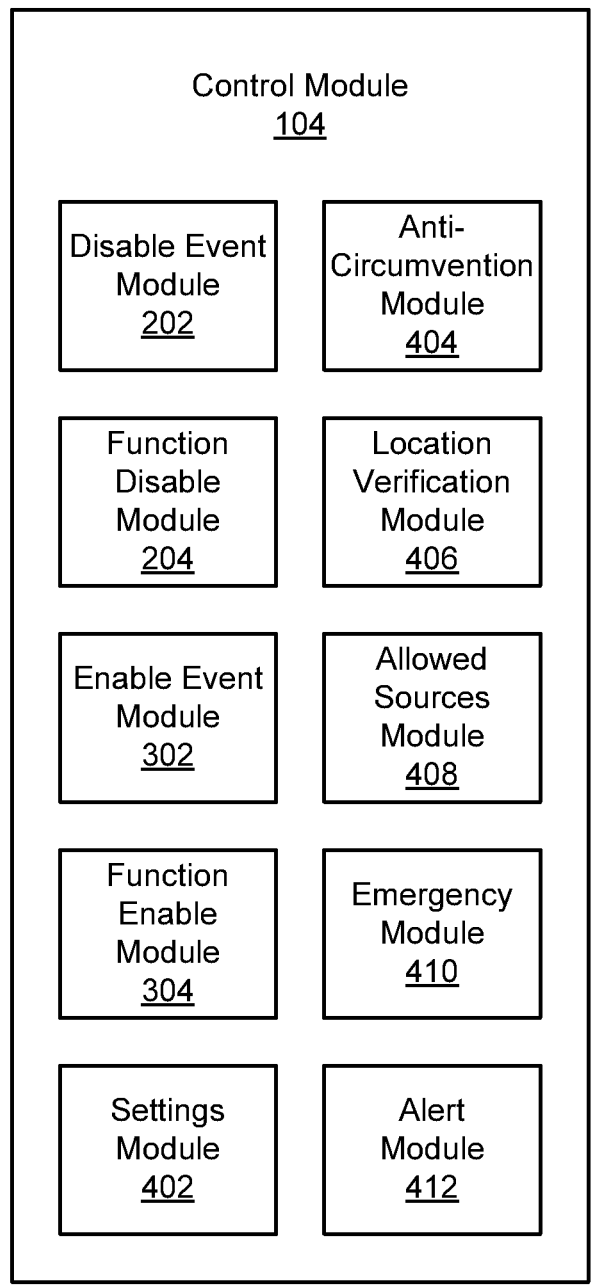
FIG. 4 is a schematic block diagram illustrating a further embodiment of a control module.

The control module 104 is described in greater detail with regard to FIGS. 2, 3, and 4. In general, the control module 104 enables and/or disables one or more functions of the mobile communications device 102 in response to one or more communications between the mobile communications device 102 and the supervisory source 108. For example, in one embodiment, the control module 104 disables one or more functions of the mobile communications device 102 in response to detecting a missed voice call for the mobile communications device 102 from the supervisory source 108. In the example, in a further embodiment, the control module 104 may enable the one or more disabled functions in response to a completed voice call between the mobile communications device 102 and the supervisory source 108. It should be noted that, unless otherwise stated, as used in this description and in the claims the phrase "in response to" should be broadly understood. Thus, it encompasses not only the traditional definitions (e.g., "in reply or answer to," "a reaction to a specific stimulus"), but other situations when there is some causal link between the two relevant events or conditions, whether direct or indirect, and whether or not there is any manual intervention.

In one embodiment, the communications network 106 provides communications between the mobile communications device 102 and the supervisory source 108. The communications network 106 may be a wireless network, a wired network, or a combination of both. For example, the communications network 106, in one embodiment, may be a cellular or satellite communications network that interfaces with the public switched telephone network ("PSTN") for communications with different communications networks and with plain old telephone service ("POTS") communications devices. In a further embodiment, the communications network 106 may include a data network such as a wireless and/or wired local area network ("LAN"), wide area network ("WAN"), the Internet, or the like.

As described relative to the control module 104, in one embodiment, the communications network 106 may include the control module 104, for example, as a network controller such as a base station controller, a mobile switching center, a router, a modem, or the like. In one embodiment, the communications network 106 is capable of blocking and unblocking individual communications to and from the mobile communications device 102, either independently or with cooperation from the mobile communications device 102.

In one embodiment, the supervisory source 108 includes one or more communications devices capable of sending communications to and receiving communications from the mobile communications device 102. In a further embodiment, the supervisory source 108 includes one or more source identifiers associated with one or more communications devices. Examples of a source identifier, in one embodiment, include a telephone number, an email address, a hostname, an Internet protocol ("IP") address, a media access control ("MAC") address; a user account and password, and the like. In various embodiments, the supervisory source 108 may be associated with a source identifier, represented by a source identifier, or may actually be a source identifier.

The source identifier, in another embodiment, may include credentials, a password, a certificate or the like, selected by or associated with the parent, supervisor or other control entity, and the supervisory source 108 may thus be any communication device suitable for use by the parent, supervisor or other control entity. The supervisory source 108 thus could be, by way of example only, a desk telephone located at an employer's headquarters, a cordless telephone located at the parent's home, a mobile telephone, a VOIP terminal located at a hotel in a vacation destination, etc.

In one embodiment, the control module 104 identifies communications to and from the supervisory source 108 based on a source identifier associated with the supervisory source 108. In another embodiment, the supervisory source 108 includes several communications devices and/or several source identifiers. In a further embodiment, several communications devices may be associated with a single supervisory source 108, such as a single telephone number, email address, or the like. The supervisory source 108, in one embodiment, may be a device that is substantially similar to the mobile communications device 102.

In a further embodiment, the supervisory source 108 is owned by, used by, or otherwise associated with an owner of the mobile communications device 102, such as a parent, an employer, or the like, that provides the mobile communications device 102 to another user, such as a child, an employee, or the like for the other user's use. In another embodiment, the supervisory source 108 is owned by, used by, or otherwise associated with an entity that the owner of the mobile communications device 102 selects, such as a family member, a friend, a coworker, or another trusted or supervisory entity. In one embodiment, a user, such as an owner of the mobile communications device 102, provides a list of one or more supervisory sources 108 to the control module 104, granting some control over functions of the mobile communications device 102 to the one or more supervisory sources 108.

FIG. 2 depicts one embodiment of the control module 104. In one embodiment, the control module 104 is substantially similar to the control module 104 described with regard to FIG. 1. In the depicted embodiment, the control module 104 includes a disable event module 202 and a function disable module 204.

The control module 104, in the depicted embodiment, allows a user to disable one or more functions of the mobile communications device 102 remotely from the supervisory source 108. In one embodiment, the disable event module 202 detects a communication sent to the mobile communications device 102 from the supervisory source 108. The disable event module 202, in a further embodiment, detects communications sent to the mobile communications device 102 from a plurality of supervisory sources 108.

The supervisory source 108, in one embodiment, is associated with and/or defined by a user with control over the mobile communications device 102, such as an owner of the mobile communications device 102. In a further embodiment, the user with control over the mobile communications device 102 provides the mobile communications device 102 to another user and would like to motivate the other user to respond to communications from the supervisory source 108. For example, in one embodiment, a parent may provide the mobile communications device 102 to a child, and may want to encourage the child to respond to voice calls, text messages, or other communications sent from the parent's telephone number. In the example embodiment, the parent may select one or more communication devices associated with the parent's telephone number (e.g., one or more home telephones) as the supervisory source 108.

In one embodiment, the disable event module 202 receives a list of one or more supervisory sources 108 from a user, such as an owner of the mobile communications device 102, or the like. In one embodiment, the disable event module 202 secures the list of one or more supervisory sources 108 such that only an authorized user can edit the list. For example, in one embodiment, the disable event module 202 may require that a user enter a password or provide other authentication before allowing a user to edit the list of supervisory sources 108. Requiring authentication, in one embodiment, restricts an unauthorized user, such as a child or employee using the mobile communications device 102, from tampering with the list of supervisory sources 108 to circumvent remote control of the mobile communications device 102.

In one embodiment, the disable event module 202 determines that the communication was sent to the mobile communications device 102 from the supervisory source 108 based on a source identifier associated with the communication. A source identifier, in one embodiment, may include a variety of identifiers such as those described with regard to the supervisory source 108 of FIG. 1. In a further embodiment, the disable event module 202 detects that a communication is sent to the mobile communications device 102 from the supervisory source 108 by comparing a source identifier associated with a communication to a list of one or more supervisory sources 108 to determine if the source identifier matches an identifier on the list.

In one embodiment, the disable event module 202 detects one or more predefined types of communications from the supervisory source 108. In one embodiment, the disable event module 202 detects missed communications sent to the mobile communications device 102 from the supervisory source 108. A missed communication, in one embodiment, is a communication that is received at the mobile communications device 102 that a user of the mobile communications device 102 fails to respond to.

A failure to respond to a communication, in one embodiment, includes a failure of a user of the mobile communications device 102 to answer a voice call. In a further embodiment, a failure to respond to a communication includes a failure of a user to view a text message or email within a predefined time period. A failure to respond to a communication, in another embodiment, includes a failure to send a response to a text message or email within a predefined time period. In one embodiment, the disable event module 202 detects a communication from the supervisory source 108 and detects a failure of a user of the mobile communications device 102 to respond to the communication.

In a further embodiment, the disable event module 202 detects communications from the supervisory source 108 that include a predefined disable command. The predefined disable command, in one embodiment, is a predefined identifier included in a communication from the supervisory source 108 that indicates that a user at the supervisory source 108 would like to disable one or more functions of the mobile communications device 102. In one embodiment, the disable event module 202 detects a failure to respond to a communication that includes a predefined disable command.

The disable event module 202, in one embodiment, parses communications from the supervisory source 108 and scans for a predefined disable command. For example, in one embodiment, a user at the supervisory source 108 may include a predefined disable command in the subject or body of an email or text message to the mobile communications device 102, enter a predefined disable command during a voice call with the mobile communications device 102, or otherwise send a communication to the mobile communications device 102 that includes a predefined disable command. In one embodiment, a user at the supervisory source 108 may enter a predefined disable command as a dual-tone multi-frequency ("DTMF") or touch-tone code during a voice call with the mobile communications device 102. In other embodiments, the disable command may be accomplished using voice commands (e.g., through voice-recognition), gesture-based commands, and data commands entered via a web-based interface. In still other embodiments, the disable command may be accomplished using one or more of the foregoing approaches in combination.

In another embodiment, the disable event module 202 may detect communications from the supervisory source 108 that include one or more predefined disable commands from a group of several predefined disable commands. For example, in one embodiment, each predefined disable command from a group of predefined disable commands corresponds to a different function or set of functions of the mobile communications device 102 that a user at the supervisory source 108 can remotely disable.

In one embodiment, the function disable module 204 disables one or more functions of the mobile communications device 102 in response to the disable event module 202 detecting the communication from the supervisory source 108. In a further embodiment, the function disable module 204 disables the one or more functions of the mobile communications device 102 in response to the disable event module 202 detecting a failure to respond to a communication from the supervisory source 108. In one embodiment, the function disable module 204 disables the one or more functions of the mobile communications device 102 in response to the disable event module 202 detecting a predefined disable command within the communication. The function disable module 204, in a further embodiment, disables the one or more functions in response to the disable event module 202 detecting a combination of these events, such as detecting a communication with a predefined disable command and detecting a failure to respond to the communication, or the like.

The function disable module 204, in one embodiment, disables substantially all functions of the mobile communications device 102. For example, in one embodiment, the function disable module 204 may disable substantially all user-controllable functions of the mobile communications device 102 by blocking a user's access to the functions, but continuing to power components of the mobile communications device 102 and maintaining a connection to the communications network 106, and the like. In a further embodiment, the function disable module 204 allows communications between the mobile communications device 102 and the supervisory source 108 while the one or more functions are disabled. In another embodiment, the function disable module 204 allows one or more emergency communications from the mobile communications device 102 while the one or more functions are disabled. Emergency communications may include, for example, 911 calls (or calls to other nationally-recognized emergency numbers in the country of use) and calls to other national, regional or local emergency numbers such as those of the state highway patrol, sheriff station, poison control center, etc.

In one embodiment, the function disable module 204 is capable of disabling both communication functions and non-communications functions of the mobile communications device 102. Examples of non-communication functions include media playback, games, executable software applications, and the like. In a further embodiment, the function disable module 204 may disable one or more communication functions, such as voice calls, text messaging, data communications, and the like, while allowing non-communication functions. For example, in one embodiment, the control module 104 may be integrated with the communications network 106, and may disable one or more communications functions of the mobile communications device 102, even without cooperation with the mobile communications device 102. In a further embodiment, the control module 104 may be integrated with the communications network 106 and may cooperate with the mobile communications device 102 to disable both communications functions and non-communications functions.

In a further embodiment, the function disable module 204 selectively disables one or more predefined functions of the mobile communications device 102. For example, in one embodiment, a user at the supervisory source 108 may include one or more predefined disable commands in a communication to the mobile communications device 102 and each predefined disable command may correspond to a different function or set of functions of the mobile communications device 102 for the function disable module 204 to disable. The function disable module 204, in a further embodiment, may receive a set of functions to disable from the disable event module 202.

By disabling one or more functions of the mobile communications device 102 in response to a communication from the supervisory source 108, the control module 104 provides the supervisory source 108 with the ability to control aspects of the mobile communications device 102 remotely. In one embodiment, where the function disable module 204 disables one or more functions in response to a missed communication, the control module 104 may motivate a user of the mobile communications device 102 to accept communications from the supervisory source 108 in an effort to prevent the function disable module 204 from disabling the one or more functions, or in the case of already-missed communications, to respond promptly so that desired functions will be enabled or restored.

FIG. 3 depicts another embodiment of the control module 104. In one embodiment, the control module 104 is substantially similar to the control module 104 described with regard to FIG. 1. In the depicted embodiment, the control module 104 includes an enable event module 302 and a function enable module 304. In a further embodiment, the control module 104 includes the enable event module 302 and the function enable module 304 and may further include the disable event module 202 and the function disable module 204. One embodiment of the control module 104 that includes the enable event module 302, the function enable module 304, the disable event module 202, and the function disable module 204 depicted in FIG. 4.

The control module 104, in the depicted embodiment, allows a user to enable or restore one or more disabled functions of the mobile communications device 102 remotely from the supervisory source 108. The disabled functions, in one embodiment, may include one or more functions that the disable event module 202 disabled, as described with regard to FIG. 2. In a further embodiment, the disabled functions may include functions that have been disabled in response to a disable event. Examples of disable events, in one embodiment, include the occurrence of a predefined curfew period, detecting that the mobile communications device 102 has entered or exited a predefined geographical location or boundary, exceeding a predefined number of allowed voice call minutes, exceeding a predefined number of allowed text messages, or the like.

In one embodiment, the enable event module 302 detects a communication between the mobile communications device 102 and the supervisory source 108. In one embodiment, the enable event module 302 detects one or more predefined types of communications between the mobile communications device 102 and the supervisory source 108. For example, the enable event module 302, in various embodiments, may be configured to detect voice calls, text messages, emails, IM's, and/or other communication types between the mobile communications device 102 and the supervisory source 108.

In one embodiment, the enable event module 302 detects voice calls between the mobile communications device 102 and the supervisory source 108 that last at least a predefined duration. In a further embodiment, the enable event module 302 detects communications that include a predefined enable confirmation from the supervisory source 108. Examples of enable confirmations, in one embodiment, may include a code in the subject or body of an email or text message to the mobile communications device 102, a code entered during a voice between the mobile communications device 102 and the supervisory source 108, a text message or email sent from the supervisory source 108 to the mobile communications device 102 within a predefined time period after a voice call, and/or another type of confirmation. In one embodiment, a user at the supervisory source 108 may enter an enable confirmation code as a DTMF or touch-tone code during a voice call with the mobile communications device 102.

In an embodiment where the enable confirmation includes a code in a communication from the supervisory source 108, the enable event module 302, in one embodiment, may parse communications from the supervisory source 108 and scan the communications for an enable confirmation. In a further embodiment, an enable confirmation may include one or more codes from a group of several enable confirmation codes. Each code from the group of enable confirmation codes, in one embodiment, corresponds to a different function or set of functions of the mobile communications device 102 that a user at the supervisory source 108 may enable. In another embodiment, the enable confirmation codes may be the same as or similar to the codes of the disable command described with regard to FIG. 2. By detecting a communication that includes an enable confirmation, in one embodiment, the enable event module 302 restricts a user of the mobile communications device 102 from circumventing the control of a user at the supervisory source 108.

In one embodiment, the enable event module 302 detects a communication from the mobile communications device 102 that includes a photograph. The mobile communications device 102, in various embodiments, may send the photograph in a text message, email, or other data communication. The photograph, in one embodiment, is a time-stamped photograph. In a further embodiment, the photograph may be taken by and/or stored on the mobile communications device 102. In another embodiment, the enable event module 302 determines whether the photograph was taken within a predefined time period based on the time-stamp. In a further embodiment, the enable event module 302 may determine whether the photograph was taken within a predefined time period before the mobile communications device 102 sends the photograph.

In one embodiment, the enable event module 302 detects a communication from the mobile communications device 102 to the supervisory source 108 that includes a photograph and detects an additional communication from the supervisory source 108 that includes an enable confirmation. The enable confirmation, in a further embodiment, may be associated with the photograph. For example, in one embodiment, an enable confirmation from the supervisory source 108 may indicate that a user at the supervisory source 108, such as a parent, employer, or the like, has reviewed the photograph and that the photograph indicates that a user of the mobile communications device 102 is in compliance with one or more restrictions set by the user at the supervisory source 108. The user at the supervisory source 108 may use the photograph to verify location restrictions, activity restrictions, and/or other restrictions that are visually perceptible based on a photograph (e.g., background, other persons, absence of bloodshot eyes or flush cheeks, etc.). Alternatively, the communication may provide both voice and video communications, and the user at the supervisory source 108 may use the video received from the mobile communications device 102 to verify compliance with the parent, supervisor or other control entity's restrictions.

In another embodiment, an enable confirmation from the supervisory source 108 includes an expected location for the mobile communications device 108. The enable event module 302, in a further embodiment, may determine that the expected location matches a current location of the mobile communications device 102. Verifying that an expected location of the mobile communications device 102 matches the actual current location of the mobile communications device 102 is discussed in greater detail with regard to the location verification module 406 of FIG. 4.

The supervisory source 108, in one embodiment, is substantially similar to the supervisory source 108 described with regard to the disable event module 202 of FIG. 2. For example, in one embodiment, the enable event module 302 and the disable event module 202 both detect communications between the mobile communications device 102 and the same supervisory source 108 and/or group of supervisory sources 108. In a further embodiment, the enable event module 302 detects communications between the mobile communications device 102 and a set of one or more supervisory sources 108 that is separately defined and independent from a disable event module 202. A communication between the mobile communications device 102 and the supervisory source 108, in one embodiment, may include communications sent from the mobile communications device 102 to the supervisory source 108 and/or communications sent from the supervisory source 108 to the mobile communications device 102.

In the depicted embodiment, the control module 104 does not include the disable event module 202 and the function disable module 204, and the enable event module 302 detects communications between the mobile communications device 102 and the supervisory source 108 independently of the disable event module 202 of FIG. 2. In one embodiment, the enable event module 302 detects communications between the mobile communications device 102 and a list of one or more supervisory sources 108, such that each supervisory source 108 on the list may enable the one or more disabled functions. In a further embodiment, the control module 104 includes or is otherwise in communication with the disable event module 202 described with regard to FIG. 2 and the enable event module 302 detects communications between the mobile communications device 102 and the same supervisory source 108 that the disable event module 202 detected a communication from, requiring the same supervisory source 108 that disabled the one or more functions to enable the one or more functions.

For example, in one embodiment, the supervisory source 108 is associated with an owner of the mobile communications device 102 that has provided the mobile communications device 102 to another user to use, such as a parent or employer may do for a child or employee. As described with regard to FIG. 2, in one embodiment, the disable event module 202 detects a failure to respond to a communication from the supervisory source 108, such as a missed voice call or the like, and the function disable module 204 disables one or more functions of the mobile communications device 102 in response to detecting the failure to respond to the communication. In the example embodiment, the enable event module 302 may detect a second, successful communication between the supervisory source 108 and the mobile communications device 102.

In a further embodiment, a user, such as an owner of the mobile communications device 102 or the like, may define a list of one or more supervisory sources 108 that may enable disabled functions on the mobile communications device 102, and the enable event module 302 detects communications between the mobile communications device 102 and each of the one or more supervisory sources 108. For example, in one embodiment, a user, such as an owner of the mobile communications device 102, may allow a family member, a friend, a coworker, and/or one or more other trusted or supervisory entities to remotely enable one or more functions on the mobile communications device 102, and may define them as a list of supervisory sources 108.

In one embodiment, the enable event module 302 secures the list of one or more supervisory sources 108 such that only an authorized user may edit the list. For example, in one embodiment, the enable event module 302 may request that a user enter a password or provide other authentication before allowing the user to edit the list of supervisory sources 108. By securing the list of supervisory sources 108, in one embodiment, the enable event module 302 restricts an unauthorized user from tampering with the list of supervisory sources 108 to circumvent remote control of the mobile communications device 102.

In one embodiment, the enable event module 302 determines that the communication was sent between the mobile communications device 102 and the supervisory source 108 based on a source identifier associated with the communication. A source identifier, in one embodiment, may include a variety of identifiers as described with regard to the supervisory source 108 of FIG. 1. In a further embodiment, the enable event module 302 detects that a communication is sent between the mobile communications device 102 and the supervisory source 108 by comparing a source identifier associated with a communication to a list of one or more supervisory sources 108 to determine if the source identifier matches an identifier on the list.

In one embodiment, the function enable module 304 enables one or more functions in response to the enable event module 302 detecting a communication between the mobile communications device 102 and the supervisory source 108. In a further embodiment, the function enable module 304 enables the one or more functions of the mobile communications device 102 in response to the enable event module 302 detecting an enable confirmation from the supervisory source 108.

The function enable module 304, in one embodiment, enables substantially all disabled functions of the mobile communications device 102. In a further embodiment, the function enable module 304 selectively enables a subset of disabled functions of the mobile communications device 102. For example, in one embodiment, a user at the supervisory source 108 may include one or more predefined enable confirmation codes in a communication to the mobile communications device 102 and each predefined enable confirmation code may correspond to a different function or set of functions of the mobile communications device 102 for the function enable module 304 to enable. The function enable module 304, in a further embodiment, may receive a set of functions to enable from the enable event module 302.

In one embodiment, the function enable module 304 temporarily enables the one or more functions and disables the one or more functions in response to the occurrence of an event. For example, in various embodiments, the function enable module 304 may disable the one or more functions in response to a predefined time period ending, the occurrence of a predefined curfew period, detecting that the mobile communications device 102 has entered or exited a predefined geographical location or boundary, exceeding a predefined number of allowed voice call minutes, exceeding a predefined number of allowed text messages, or the like.

FIG. 4 depicts a further embodiment of the control module 104. In the depicted embodiment, the control module 104 includes the disable event module 202, the function disable module 204, the enable event module 302, and the function enable module 304, substantially as described with regard to FIGS. 2 and 3. The control module 104, in the depicted embodiment, further includes a settings module 402, an anti-circumvention module 404, a location verification module 406, an allowed sources module 408, an emergency module 410, and an alert module 412.

Conveniently, in some embodiments, the parent, supervisor or other control entity may optionally customize the manner of operation of the control module 104 or other elements of the embodiments using the settings module 402. The settings module 402, in one embodiment, may receive the one or more settings as user input to the mobile communications device 102. In a further embodiment, the settings module 402 may receive the one or more settings as user input to a web page, a network connected software application, or the like that is in communication with the control module 104. For example, in one embodiment, a user may provide one or more settings by logging in to a user account associated with the communications network 106. A user interface may be provided to the parent, supervisor or other control entity with check-lists, drop-down menus or other suitable selection options to select or otherwise customize features using parameters such as, for example, the following:

Source Identifier Settings: These settings may include a selection of source identifiers such as a telephone number, email address, hostname, Internet protocol ("IP") address, media access control ("MAC") address; or user account and password.

Supervisory Sources: These settings may include a set of one or more supervisory sources 108 for the disable event module 202 and/or the enable event module 302. These settings, in a further embodiment, may include a set of supervisory sources 108 for the allowed sources module 408.

Disable Criteria: These settings provide options such as whether the user of the mobile communications device 102 will receive any leeway before the control module 104 begins to disable functions.

Functions to Disable: These settings may include a selection of functions and/or sets of functions for the function disable module 204 to disable.

Order of Disabling: These settings provide options for setting the order in which functions may be disabled (e.g., in a progressive disabling mode, described below).

Emergency Module Functions. These settings provide options for setting the emergency numbers for the emergency module 410.

Alerts: These settings may include a selection of an alert and/or type of alert for the alert module 412.

Enable/Restore Criteria. These settings provide options for the manner in which functions may be enabled or restored.

Enable/Restore Options. These settings may include a selection of functions and/or sets of functions for the function enable module 304 to enable.

Control Code Options: These settings may include a selection of one or more codes, passwords, or the like. The one or more codes, passwords, or the like may be used by one or more modules for authentication purposes, used as disable commands, used as enable confirmation codes, and the like. In one embodiment, the settings module 402 may require that a user enter a password or provide other authentication before allowing a user to provide, view, and/or edit the one or more settings. By requiring authentication, the settings module 402, in one embodiment, restricts an unauthorized user from tampering with the one or more settings to circumvent remote control of the mobile communications device 102.

In one embodiment, the anti-circumvention module 404 restricts a user of the mobile communications device 102 from circumventing control measures taken by a user at the supervisory source 108. In one embodiment, the anti-circumvention module 404 may be integrated with the enable event module 302, the function enable module 304, and/or the settings module 402.

In one embodiment, where the enable event module 302 detects a voice call between the mobile communications device 102 and the supervisory source 108, the anti-circumvention module 404 requires that the voice call last at least a predefined duration before the function enable module 304 enables one or more functions. In a further embodiment, the anti-circumvention module 404 may require that a voice call is connected between the mobile communications device 102 and the supervisory source 108 and/or that voice communications occur between the mobile communications device 102 and the supervisory source 108 before the function enable module 304 enables one or more functions.

In a further embodiment, the anti-circumvention module 404 requires that the enable event module 302 detect an enable confirmation from the supervisory source 108 before the function enable module 304 enables one or more functions. For example, the anti-circumvention module 404, in various embodiments, may require that the enable event module 302 detect a communication between the mobile communications device 102 and the supervisory source 108 that includes one or more predefined enable confirmation codes, that the enable event module 302 detect a confirmation text message or email sent from the supervisory source 108 to the mobile communications device 102, and/or another enable confirmation from the supervisory source 108.

In a further embodiment, the anti-circumvention module 404 restricts the user of the mobile communications device 102 from disabling one or more network connections. In this manner, the anti-circumvention module 404 restricts the user of the mobile communications device 102 from avoiding communications from the supervisory source 108, whether initial communications that require a response (such as the acceptance of a phone call from a parent, supervisor or other control entity), or function-disabling communications following a failure to respond to a previous communication.

In one embodiment, the location verification module 406 confirms that a user at the supervisory source 108 has knowledge of the actual location of the mobile communications device 102. The location verification module 406, in one embodiment, detects the location of the mobile communications device 102 using GPS or other location detection hardware integrated with the mobile communications device 102. In a further embodiment, the location verification module 406 detects the location of the mobile communications device 102 based on the location of one or more base stations in the communications network 106 that the mobile communications device 102 communicates with. In one embodiment, the location verification module 406 displays a detected location of the mobile communications device 102 to a user at the supervisory source 108. In a further embodiment, the location verification module 406 may send a time-stamped photograph from the mobile communications device 102 to the supervisory source 108.

In another embodiment, the location verification module 406 receives an expected location of the mobile communications device 102 from a user at the supervisory source 108. The location verification module 406, in one embodiment, may receive the expected location as an address, a city, a zip code, latitude and longitude coordinates, a selection on a map, a name of a landmark or business, and/or the like. In a further embodiment, the location verification module 406 may receive the expected location as an enable confirmation indicating that a current location and/or photograph that the location verification module 406 sent to the supervisory source 108 matches an expected location. The location verification module 406, in a further embodiment, may determine whether the expected location matches an actual current location of the mobile communications device 102. In one embodiment, the function enable module 304 enables the one or more functions in response to the location verification module 406 determining that the expected location matches the current location of the mobile communications device 102 and does not enable the one or more functions if they do not match.

In one embodiment, the allowed sources module 408 allows communications between the mobile communications device 102 and one or more supervisory sources 108 while one or more functions of the mobile communications device 102 are disabled. In one embodiment, the allowed sources module 408 allows communications between the mobile communications device 102 and the supervisory source 108 that caused the one or more functions of the mobile communications device 102 to be disabled. In a further embodiment, the allowed sources module 408 allows communications between the mobile communications device 102 and a set of supervisory sources 108.

In one embodiment, the allowed sources module 408 restricts the function disable module 204 from disabling communications between the mobile communications device 102 and one or more supervisory sources 108. In a further embodiment, the function disable module 204 disables communications between the mobile communications device 102 and one or more supervisory sources 108 and the allowed sources module 408 bypasses the disabling, allowing communications between the mobile communications device 102 and the one or more supervisory sources 108. In another embodiment, the allowed sources module 408 may allow communications of one or more predefined types between the mobile communications device 102 and one or more supervisory sources 108, but allow the function disable module 204 to disable one or more other types of communications.

In one embodiment, the emergency module 410 allows one or more emergency communications from the mobile communications device 102 while the one or more functions are disabled. In one embodiment, the emergency module 410 restricts the function disable module 204 from disabling one or more types of emergency communications from the mobile communications device 102. In a further embodiment, the function disable module 204 disables emergency communications from the mobile communications device 102 and the emergency module 410 bypasses the disabling, allowing one or more emergency communications to be sent from the mobile communications device 102.

In one embodiment, the alert module 412 initiates an alert from the mobile communications device 102 in response to the disable event module 202 detecting the communication from the supervisory source 108. The alert, in one embodiment, may include a visual alert on a screen of the mobile communications device 102. The alert, in a further embodiment, may include an audible alert from a speaker of the mobile communications device 102. The alert, in one embodiment, may inform a user of the mobile communications device 102 that one or more functions have been disabled. In a further embodiment, the alert may remind a user of one or more actions to take to enable the one or more functions. The alert, in another embodiment, may provide motivation for a user to enable the one or more functions. For example, in one embodiment, the alert may be selected to provide an annoyance or an embarrassment to a user to motivate the user to return a missed communication from the supervisory source 108.

Figure 5:
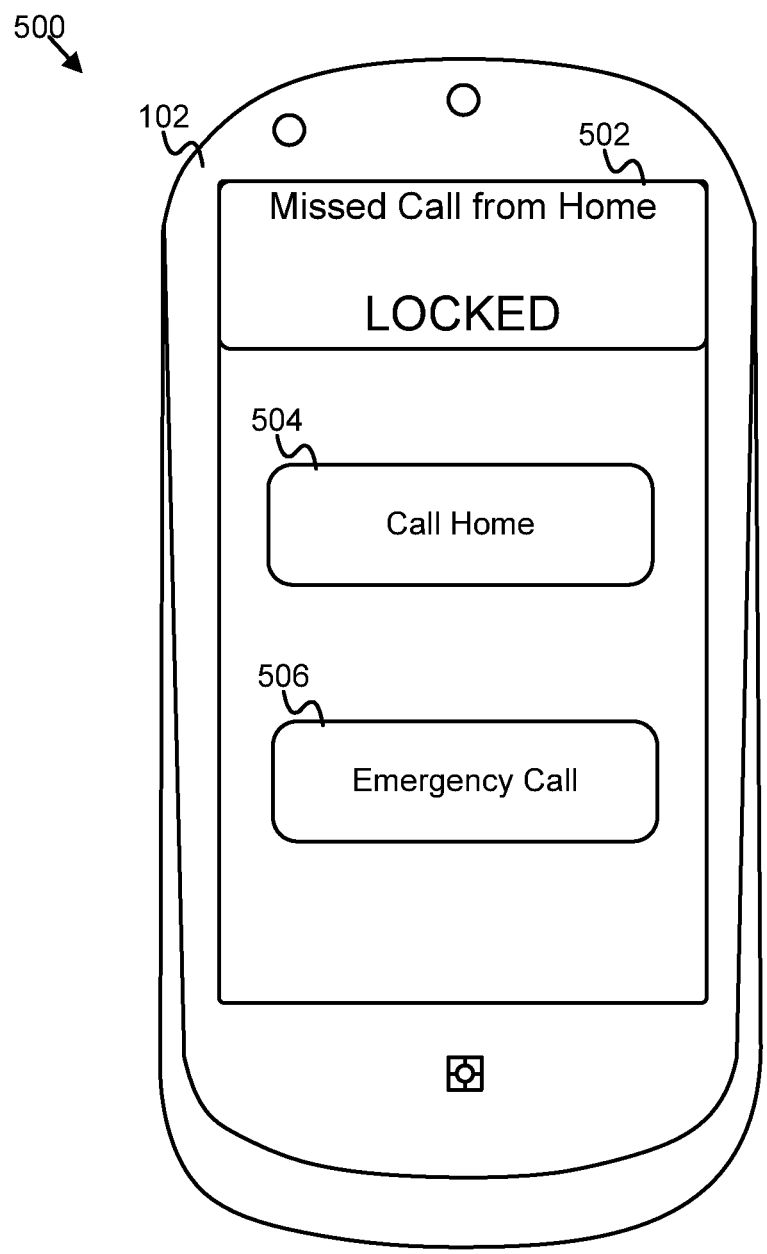
FIG. 5 is a schematic block diagram illustrating one embodiment of a mobile communications device.

FIG. 5 depicts one embodiment 500 of the mobile communications device 102. In the depicted embodiment 500, the mobile communications device 102 includes an alert 502, an allowed communication element 504, and an emergency communication element 506. The mobile communications device 102, in the depicted embodiment 500, displays the alert 502, the allowed communication element 504, and the emergency communication element 506 to the user on a screen of the mobile communications device 102. In one embodiment, a parent provides the mobile communications device 102 to a child for the child's use, and "Home" represents a supervisory source 108 associated with the parent, such as a telephone number of the parent or the like.

In one embodiment, the alert module 412 initiates the alert 502. The alert 502, in the depicted embodiment 500, includes a graphical element that visually indicates to a user of the mobile communications device 102 that the user missed a call from "Home" and that one or more functions of the mobile communications device 102 have been disabled or "locked." In the depicted embodiment 500, "Home" represents a supervisory source 108 for the mobile communications device 102. In a further embodiment, the alert 502 may include an audible alert from a speaker of the mobile communications device 102, or the like.

In the depicted embodiment 500, the allowed communication element 504 includes a graphical element provided by the allowed sources module 408 that allows communications between the mobile communications device 102 and one or more supervisory sources 108 while one or more functions of the mobile communications device 102 are disabled. The allowed communication element 504, in the depicted embodiment 500, allows a user of the mobile communications device 102 to "Call Home," meaning that the allowed sources module 408 allows a voice call from the mobile communications device 102 to "Home," the supervisory source 108 of the depicted embodiment 500.

In the depicted embodiment 500, the emergency communication element 506 includes a graphical element provided by the emergency module 410 that allows one or more emergency communications from the mobile communications device 102 while the one or more functions are disabled. The emergency communication element 506, in one embodiment, facilitates an emergency voice call to a predefined emergency number, regardless of what functions are disabled on the mobile communications device 102.

In one embodiment, the disable event module 202 detects a communication sent to the mobile communications device 102 from a supervisory source 108. In the depicted embodiment 500, the supervisory source 108 is "Home" and the communication is a voice call. In a further embodiment, the disable event module 202 detects a failure to respond to the communication. In the depicted embodiment 500, a user of the mobile communications device 102 misses the call from "Home." The function disable module 204, in one embodiment, disables one or more functions of the mobile communications device 102 in response to the disable event module 202 detecting the communication and/or detecting a failure to respond to the communication. In the depicted embodiment 500, the alert module 412 initiates the alert 502 from the mobile communications device 102 in response to the disable event module 202 detecting the communication and/or detecting a failure to respond to the communication. In the depicted embodiment 500, substantially all user functions of the mobile communications device 102 other than a voice call to the supervisory source 108 and emergency communications are disabled.

In one embodiment, in response to the enable event module 302 detecting a second communication between the mobile communications device 102 and the supervisory source 108, the function enable module 304 enables the one or more disabled functions. For example, in the depicted embodiment 500, the enable event module 302 may detect a voice call to "Home," the supervisory source 108, using the allowed communication element 504 and the function enable module 304 may enable the one or more disabled functions on the mobile communications device 102. In a further embodiment, the anti-circumvention module 404 may determine that a voice call between the mobile communications device 102 and the supervisory source 108 lasts at least a predefined duration, that the communication includes an enable confirmation from the supervisory source 108, or the like before the function enable module 304 enables the one or more disabled functions.

In one or more embodiments, it may be desirable to provide the end-user of the mobile communications device some leeway before any functions of his or her mobile communications device are disabled in response to a failure to respond to a communication from the supervisory source 108. The disable event module 202, in one embodiment, may wait for a predefined time period upon receiving a communication from the supervisory source 108 before detecting a failure to respond to the communication. For example, there may be circumstances when the mobile communications device 102 is out of network communications range or otherwise not receiving network communications through no fault of its user. In such case, the control module 104 may enter a wait mode, and disable one or more functions of the mobile communications device 102 only after some predefined time period has elapsed once the mobile communications device 102 begins receiving network communications again, such that the child or other user of the mobile communications device 102 may have an opportunity to respond to the communication from the supervisory source 108.

Leeway may also be provided by permitting the occurrence of one or more failures to respond to communications from the supervisory source 108 before the control module 104 disables one or more functions of the mobile communications device 102. In one embodiment, the disable event module 202 may detect a failure to respond to a predefined number of previous communications from the supervisory source 108 before the function disable module 204 disables one or more functions of the mobile communications device 102. For example, a parent may decide that his or her child should be given a second chance to respond to his or her communication on a given evening, in which case the control module 104 may disable one or more functions of the mobile communications device 102 in response to the child's second failure to respond on that evening.

In still other embodiments, the functions of the mobile communications device 102 may be disabled in a progressive manner. The function disable module 204, in one embodiment, may disable a different set of functions for each successive failure to respond to a communication from the supervisory source 108. For example, in response to a first failure to respond to a communication from the supervisory source 108, the control module 104 may disable all video game functions of the mobile communications device 102; in response to a second failure to respond to a communication from the supervisory source 108, the control module 104 may disable all multi-media (e.g., music and video playback) functions of the mobile communications device 102; in response to a third failure to respond to a communication from the supervisory source 108, the control module 104 may disable all text messaging and remaining non-emergency functions of the mobile communications device 102. A parent may be aware of his or her child's preferred functions, and choose to disable the most preferred functions only after giving the child a second or third chance to respond. In this manner, particular embodiments may be tailored to a particular user of the mobile communications device 102.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The methods described relative to the following schematic flow chart diagrams substantially include the steps to carry out the functions presented above with respect to the operation of the described apparatus and system of FIGS. 1, 2, 3, 4, and 5. In one embodiment, one or more of the methods are implemented with a computer readable storage medium storing computer executable program code on a tangible storage device. The computer readable storage medium may be integrated into a computing system, such as the mobile communications device 102, a network controller of the communications network 106, or the like, wherein the computer readable program executed by the computing system performs one or more of the methods.

Figure 6:
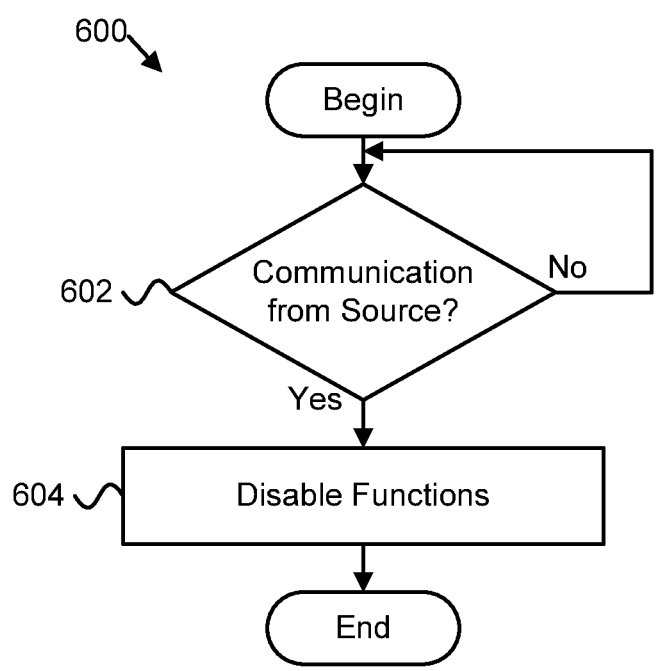
FIG. 6 is a schematic flow chart diagram illustrating one embodiment of a method for control of a mobile device.

FIG. 6 depicts one embodiment of a method 600 for control of a mobile device. In the depicted embodiment, the method 600 begins, and the disable event module 202 detects 602 whether a communication has been sent to the mobile communications device 102 from a supervisory source 108. As described with regard to the disable event module 202, in one embodiment, the communication that the disable event module 202 detects 602 may be a predefined type of communication, such as a communication that is not responded to, a communication that includes a disable command, and/or has other predefined characteristics.

If the disable event module 202 does not detect 602 a communication sent to the mobile communications device 102 from a supervisory source 108, in the depicted embodiment, the disable event module 202 continues detecting 602 communications from a supervisory source 108. If the disable event module 202, in the depicted embodiment, detects 602 that a communication has been sent to the mobile communications device 102 from a supervisory source 108, the function disable module 204 disables 604 one or more functions of the mobile communications device 102 and the method 600 ends.

Figure 7:
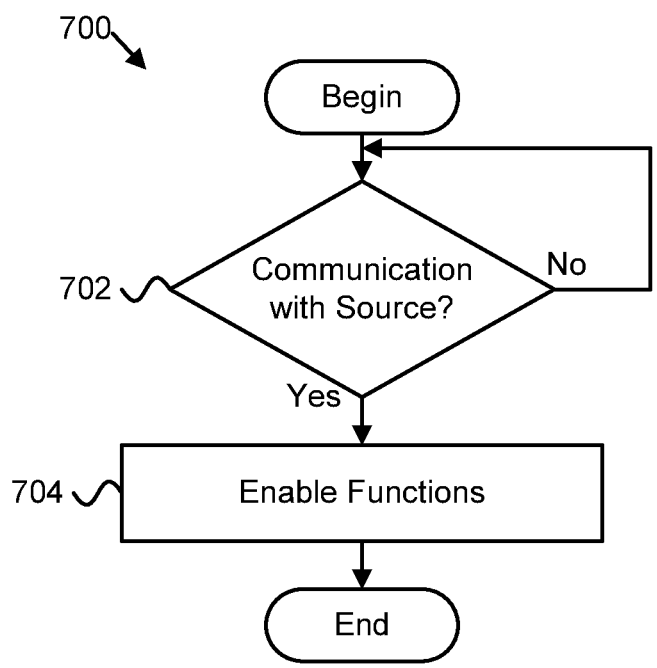
FIG. 7 is a schematic flow chart diagram illustrating another embodiment of a method for control of a mobile device.

FIG. 7 depicts one embodiment of a method 700 for control of a mobile device. In the depicted embodiment, the method 700 begins, and the enable event module 302 detects 702 whether there has been a communication between the mobile communications device 102 and a supervisory source 108. As described with regard to the anti-circumvention module 404, in one embodiment, the communication that the enable event module 302 detects 702 may include a voice call lasting at least a predefined duration, a communication that includes an enable confirmation, or the like.

If the enable event module 302 does not detect 702 a communication between the mobile communications device 102 and a supervisory source 108, in the depicted embodiment, the enable event module 302 continues detecting 702 communications between the mobile communications device 102 and a supervisory source 108. If the enable event module 302, in the depicted embodiment, detects 702 a communication between the mobile communications device 102 and a supervisory source 108, the function enable module 304 enables 704 one or more functions of the mobile communications device 102 and the method 700 ends.

Figure 8:
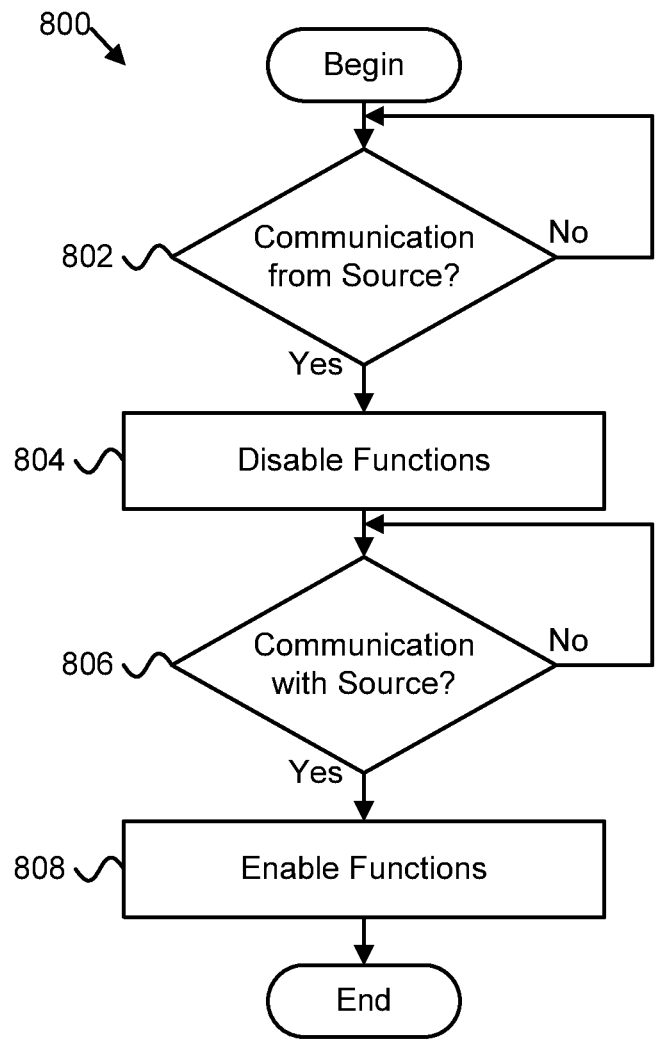
FIG. 8 is a schematic flow chart diagram illustrating another embodiment of a method for control of a mobile device.

FIG. 8 depicts one embodiment of a method 800 for control of a mobile device. In the depicted embodiment, the method 800 begins, and the disable event module 202 detects 802 whether a communication has been sent to the mobile communications device 102 from a supervisory source 108. In one embodiment, the communication that the disable event module 202 detects 802 may be a predefined type of communication, such as a communication that is not responded to, a communication that includes a disable command, and/or has other predefined characteristics.

If the disable event module 202 does not detect 802 a communication sent to the mobile communications device 102 from a supervisory source 108, in the depicted embodiment, the disable event module 202 continues detecting 802 communications from a supervisory source 108. If the disable event module 202, in the depicted embodiment, detects 802 that a communication has been sent to the mobile communications device 102 from a supervisory source 108, the function disable module 204 disables 804 one or more functions of the mobile communications device 102.

In the depicted embodiment, the enable event module 302 detects 806 whether there has been a communication between the mobile communications device 102 and a supervisory source 108. In one embodiment, the communication that the enable event module 302 detects 806 may include a voice call lasting at least a predefined duration, a communication that includes an enable confirmation, or the like. In one embodiment, the communication that the enable event module 302 detects 806 is a communication between the mobile communications device 102 and the same supervisory source 108 from which the disable event module 202 detects 802 a communication.

If the enable event module 302 does not detect 806 a communication between the mobile communications device 102 and a supervisory source 108, in the depicted embodiment, the enable event module 302 continues detecting 806 communications between the mobile communications device 102 and a supervisory source 108. If the enable event module 302, in the depicted embodiment, detects 806 a communication between the mobile communications device 102 and a supervisory source 108, the function enable module 304 enables 808 one or more functions of the mobile communications device 102 and the method 700 ends. In one embodiment, the function enable module 304 enables 808 the same set of one or more functions that the function disable module 204 disables 804.

Figure 9:
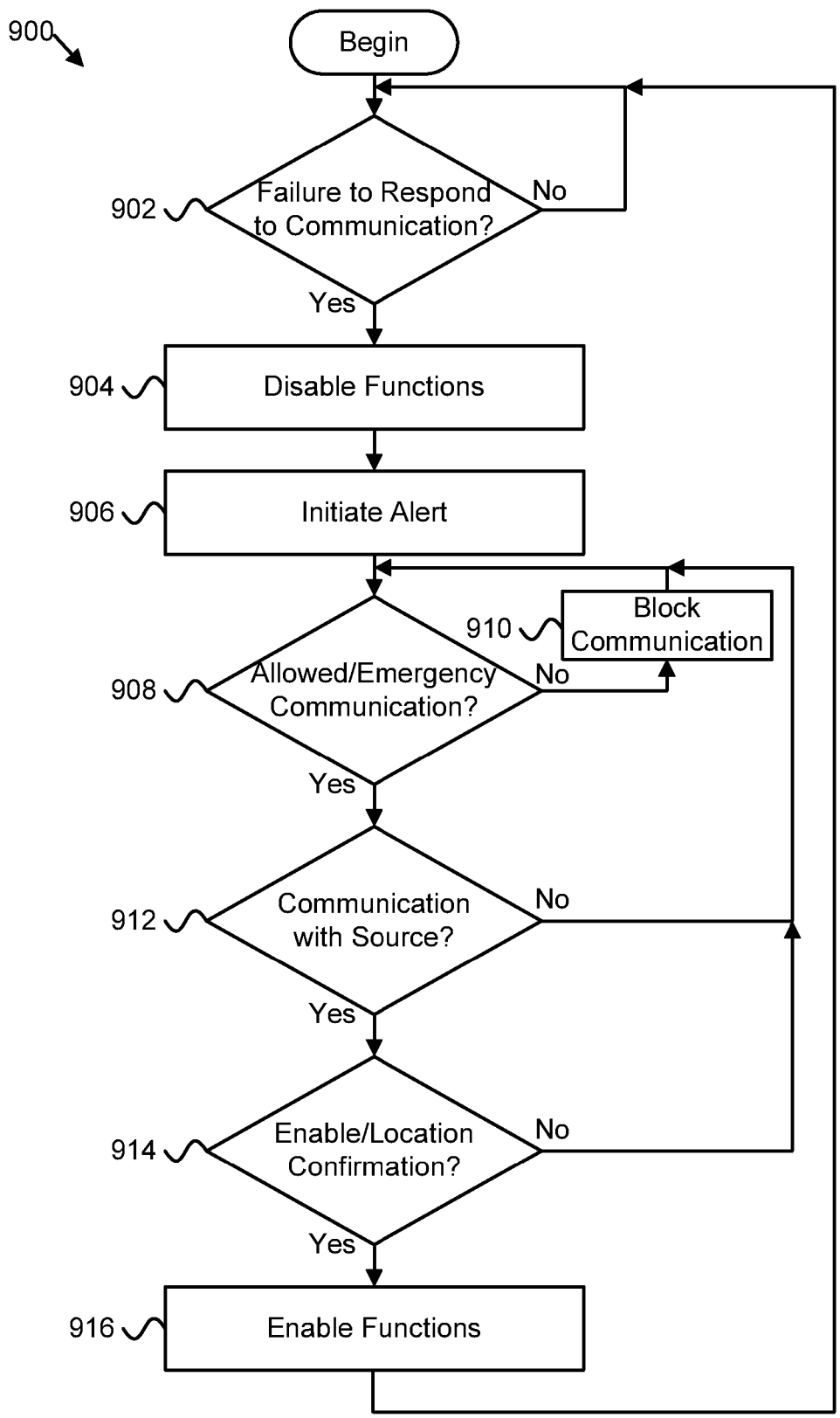
FIG. 9 is a schematic flow chart diagram illustrating a further embodiment of a method for control of a mobile device.

FIG. 9 depicts one embodiment of a method 900 for control of a mobile device. In the depicted embodiment, the method 900 begins, and the disable event module 202 detects 902 a failure to respond to a communication. The communication, in one embodiment, was sent to the mobile communications device 102 from a supervisory source 108. In another embodiment, the disable event module 202 detects 902 a failure to respond to a predefined number of communications from the supervisory source 108. In one embodiment, the disable event module 202 waits a predefined time period upon receiving the communication and detects 902 a failure to respond to a communication within the predefined time period.

If the disable event module 202 does not detect 902 a failure to respond to a communication sent to the mobile communications device 102 from a supervisory source 108, in the depicted embodiment, the disable event module 202 continues detecting 902 failures to respond to communications from a supervisory source 108. If the disable event module 202, in the depicted embodiment, detects 902 a failure to respond to a communication sent to the mobile communications device 102 from a supervisory source 108, the function disable module 204 disables 904 one or more functions of the mobile communications device 102. In a further embodiment, the function disable module 204 progressively disables 904 a different set of one or more functions of the mobile communications device 102 for each successive failure to respond to a communication that the disable event module 202 detects 902. The alert module 412, in the depicted embodiment, initiates 906 an alert from the mobile communications device 102.

In response to a subsequent communication to or from the mobile communications device 102, in the depicted embodiment, the allowed sources module 408 and the emergency module 410 determine 908 whether the subsequent communication is an allowed communication between the mobile communications device 102 and a supervisory source 108 or an emergency communication. If the allowed sources module 408 and the emergency module 410 determine 908 that the subsequent communication is not an allowed communication or an emergency communication, in the depicted embodiment, the function disable module 204 directly or indirectly blocks 910 the subsequent communication.

In the depicted embodiment, if the allowed sources module 408 and the emergency module 410 determine 908 that the subsequent communication is an allowed communication or an emergency communication, the subsequent communication is allowed, and the enable event module 302 detects 912 whether the subsequent communication is between the mobile communications device 102 and a supervisory source 108. In one embodiment, the communication that the enable event module 302 detects 912 is a communication between the mobile communications device 102 and the same supervisory source 108 from which the disable event module 202 detects 902 a communication.

If the enable event module 302 does not detect 912 that the subsequent communication is between the mobile communications device 102 and a supervisory source 108, in the depicted embodiment, the allowed sources module 408 and the emergency module 410 continue to determine 908 whether subsequent communications are allowed communications or emergency communications. If the enable event module 302, in the depicted embodiment, detects 912 that the subsequent communication is between the mobile communications device 102 and a supervisory source 108, the anti-circumvention module 404 determines 914 whether the subsequent communication includes an enable confirmation and the location verification module 406 determines 914 whether an expected location of the mobile communications device 102 matches an actual current location of the mobile communications device 102.

If the anti-circumvention module 404 and/or the location verification module 406 make a negative determination 914, in the depicted embodiment, the allowed sources module 408 and the emergency module 410 continue to determine 908 whether subsequent communications are allowed communications or emergency communications. If the anti-circumvention module 404 and the location verification module 406 make positive determinations 914, in the depicted embodiment, the function enable module 304 enables 916 the one or more functions of the mobile communications device 102. In one embodiment, the function enable module 304 enables 916 the same set of one or more functions that the function disable module 204 disabled 904. In a further embodiment, the function enable module 304 enables 916 several different sets of functions that the function disable module 204 has disabled. In the depicted embodiment, the method 900 returns to the detection step 902, and the disable event module 202 continues to detect 902 failures to respond to communications sent to the mobile communications device 102 from a supervisory source 108.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
selectively disabling, by use of a processor, one or more functions of a mobile communications device in response to detecting a failure to respond to a communication sent to the mobile communication device from a supervisory source; and
enabling, by use of the processor, the one or more functions in response to detecting a second communication between the mobile communications device and the supervisory source.

2. The method of claim 1, further comprising,
receiving an expected location from the supervisory source;
determining that the expected location matches a current location of the mobile communications device, wherein the one or more functions are enabled in response to detecting the second communication and
a determination that the expected location matches the current location.

3. The method of claim 1, wherein the second communication comprises a time-stamped photograph sent from the mobile communications device to the supervisory source and further wherein the one or more functions are enabled in response to detecting the second communication and in response to receiving an enable confirmation from the supervisory source.

4. The method of claim 1, further comprising allowing one or more emergency communications from the mobile communications device while the one or more functions are disabled.

5. The method of claim 1, further comprising initiating an alert from the mobile communications device in response to detecting the failure to respond to the communication.

6. The method of claim 1, wherein the mobile communications device comprises a mobile telephone device, the supervisory source comprises a predefined telephone number, and the communication comprises a voice call from the predefined telephone number.

7. The method of claim 1, further comprising detecting a failure to respond to a predefined number of previous communications from the supervisory source, the number of previous communications sent to the mobile communications device from the supervisory source prior to the communication, wherein the one or more functions of the mobile communications device are disabled in response to detecting the failure to respond to the communication and further in response to detecting the failure to respond to the predefined number of previous communications.

8. The method of claim 1, further comprising waiting a predefined time period in response to receiving the communication, wherein detecting the failure to respond to the communication comprises detecting a failure to respond to the communication within the predefined time period.

9. The method of claim 1, further comprising allowing communications between the mobile communications device and the supervisory source while the one or more functions are disabled.

10. The method of claim 1, wherein the second communication comprises a voice call between the mobile communications device and the supervisory source, the voice call lasting at least a predefined duration.

11. The method of claim 1, wherein the second communication comprises an enable confirmation from the supervisory source.

12. The method of claim 11, wherein the enable communication comprises a code entered from the supervisory source during the second communication, the second communication comprising a voice call between the mobile communications device and the supervisory source.

13. The method of claim 11, wherein the enable confirmation comprises a text message from the supervisory source to the mobile communications device.

14. The method of claim 1, wherein the communication is selected from the group consisting of an email message and a text message.

15. The method of claim 14, wherein a failure to respond to the communication comprises a failure to view the communication within a predefined time period.

16. The method of claim 14, wherein the communication comprises a predefined disable command.

17. A method comprising:
producing computer executable program code;
providing the computer executable program code to be deployed to a non-transitory computer readable storage medium and executed on a computer system, the computer executable program code performing:
selectively disabling one or more functions of a mobile communications device in response to detecting a failure to respond to a communication sent to the mobile communication device from a supervisory source; and
enabling, by use of the processor, the one or more functions in response to detecting a second communication between the mobile communications device and the supervisory source.

18. The method of claim 17, wherein the second communication comprises a voice call between the mobile communications device and the supervisory source, the voice call lasting at least a predefined duration.

19. An apparatus comprising:
a first processor;
a non-transitory computer readable storage medium storing computer executable program code executable by a second processor, the computer executable program code performing:
selectively disabling one or more functions of a mobile communications device in response to detecting a failure to respond to a communication sent to the mobile communication device from a supervisory source; and
enabling, by use of the processor, the one or more functions in response to detecting a second communication between the mobile communications device and the supervisory source.

20. The apparatus of claim 19, wherein the second communication comprises a voice call between the mobile communications device and the supervisory source, the voice call lasting at least a predefined duration.

* * * * *